United States Patent
Azuma et al.

(10) Patent No.: US 12,531,391 B2
(45) Date of Patent: Jan. 20, 2026

(54) SEMICONDUCTOR OPTICAL INTEGRATED ELEMENT

(71) Applicant: Mitsubishi Electric Corporation, Tokyo (JP)

(72) Inventors: Yusuke Azuma, Tokyo (JP); Yoshimichi Morita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 706 days.

(21) Appl. No.: 17/905,468

(22) PCT Filed: Apr. 27, 2020

(86) PCT No.: PCT/JP2020/017986
§ 371 (c)(1),
(2) Date: Sep. 1, 2022

(87) PCT Pub. No.: WO2021/220347
PCT Pub. Date: Nov. 4, 2021

(65) Prior Publication Data
US 2023/0102522 A1     Mar. 30, 2023

(51) Int. Cl.
*H01S 5/026* (2006.01)
*G02F 1/025* (2006.01)
(Continued)

(52) U.S. Cl.
CPC ............ *H01S 5/0265* (2013.01); *G02F 1/025* (2013.01); *H01S 5/02469* (2013.01); *H01S 5/12* (2013.01); *H01S 5/227* (2013.01)

(58) Field of Classification Search
CPC ...... H01S 5/0265; H01S 5/02469; H01S 5/12; H01S 5/227; H01S 5/1014; H01S 5/2222; H01S 5/2275; G02F 1/025
See application file for complete search history.

(56) References Cited

U.S. PATENT DOCUMENTS 6,191,464 B1 *   2/2001   Barnard ............... H01S 5/04256
                                                       257/427
6,287,884 B1 *   9/2001   Jie ........................... H01S 5/227
                                                       438/46
(Continued)

FOREIGN PATENT DOCUMENTS

JP    2001-142037 A    5/2001
JP    2009-222965 A    10/2009
JP    2014-053525 A    3/2014

OTHER PUBLICATIONS

International Search Report issued in PCT/JP2020/017986; mailed Jul. 14, 2020.

*Primary Examiner* — Xinning(Tom) Niu
(74) *Attorney, Agent, or Firm* — Studebaker Brackett PLLC

(57) ABSTRACT

A semiconductor optical integrated element of the present disclosure includes: a laser diode portion which is provided on one end side above a substrate, has a first optical waveguide, and emits a laser beam; a modulator portion which is provided on another end side, has a second optical waveguide, and modulates the laser beam; a separation region provided between the laser diode portion and the modulator portion; and a pair of grooves provided on both sides along the first optical waveguide and the second optical waveguide. The second optical waveguide in the separation region and the second optical waveguide in a part on the separation region side in the modulator portion have a buried structure, and the second optical waveguide in a remaining part in the modulator portion has a high-mesa-ridge structure.

16 Claims, 13 Drawing Sheets

(51) Int. Cl.
*H01S 5/024* (2006.01)
*H01S 5/12* (2021.01)
*H01S 5/227* (2006.01)

(56) References Cited

U.S. PATENT DOCUMENTS

| | | | |
|---|---|---|---|
| 6,343,163 B1* | 1/2002 | Kawanishi | H01S 5/026 |
| | | | 385/40 |
| 7,340,142 B1* | 3/2008 | Shinoda | G02B 6/12004 |
| | | | 438/30 |
| 2002/0018503 A1* | 2/2002 | Nakamura | H01S 5/12 |
| | | | 372/50.1 |
| 2002/0131466 A1* | 9/2002 | Salvatore | H01S 5/12 |
| | | | 372/50.22 |

* cited by examiner

SEMICONDUCTOR OPTICAL INTEGRATED ELEMENT

TECHNICAL FIELD

The present disclosure relates to a semiconductor optical integrated element.

BACKGROUND ART

In an access system which is an optical communication system between a relay station and a user, conventionally, a directly modulated semiconductor laser (DML) transmitter suitable for low-speed modulation has been often used. However, in a case of performing high-speed communication at 10 Gb/s or higher, a semiconductor optical integrated element (electro-absorption modulator integrated laser (EML)) formed by integrating a laser diode (which may be simply referred to as LD) which is a light source and an electro-absorption semiconductor optical modulator (EAM, hereafter referred to as EA modulator) suitable for high-speed modulation on the same substrate, is used.

As optical waveguide structures of a laser diode portion and an EA modulator portion composing a semiconductor optical integrated element, the following structures may be adopted in accordance with purposes of semiconductor optical integrated elements: a buried optical waveguide structure (which may be hereafter referred to as buried structure) in which a core layer for guiding or modulating a laser beam is buried with semiconductor layers at both side surface parts thereof, a high-mesa-ridge optical waveguide structure (which may be hereafter referred to as high-mesa-ridge structure) in which a core layer is not buried with semiconductor layers at both side surface parts thereof, and a low-mesa-ridge optical waveguide structure in which a groove does not reach a core layer.

In a conventional semiconductor optical integrated element, an optical waveguide of an EA modulator portion is formed with the same structure along the optical-axis direction, i.e., the sectional shape crossing the optical axis is constant. In addition, in order to improve heat dissipation of the EA modulator portion, the following structures are proposed: a structure in which a core layer is buried with semiconductor layers at both side surface parts thereof and heat dissipation bodies are provided on the outer sides of the burying semiconductor layers (Patent Document 1), a structure in which an electrode pad is provided on a beam input side of the EA modulator portion where the heat generation amount is large, so as to improve heat dissipation (Patent Document 2), and a structure in which heat dissipation bodies formed by metal thin films are provided along the optical-axis direction at both side surface parts of a ridge-type optical waveguide so as to improve heat dissipation (Patent Document 3), for example.

CITATION LIST

Patent Document

Patent Document 1: Japanese Laid-Open Patent Publication No. 2014-53525
Patent Document 2: Japanese Laid-Open Patent Publication No. 2009-222965
Patent Document 3: Japanese Laid-Open Patent Publication No. 2001-142037

SUMMARY OF THE INVENTION

Problems to be Solved by the Invention

In a case where the entirety of the conventional EA modulator portion is formed as a buried structure, heat dissipation is improved, but the buried structure part has a capacitive component, so that high-frequency property is inferior to that of a high-mesa-ridge structure.

On the other hand, in a case where the entire EA modulator portion is formed as a high-mesa-ridge structure, the capacitance can be reduced and thus high-frequency property is improved, but heat generated in an optical absorption layer is less likely to be diffused to the surroundings, i.e., heat dissipation is less than in a case of a buried structure.

Therefore, in a case where beam input power to the EA modulator portion is great, heat generation in the semiconductor optical integrated element increases, so that element property might be deteriorated (Patent Document 1 and Patent Document 2). In addition, the element might be broken due to excessive heat generation (Patent Document 3).

The present disclosure has been made to solve the above problem, and an object of the present disclosure is to provide a semiconductor optical integrated element that can achieve both of high-frequency property and necessary heat dissipation in an EA modulator portion.

Solution to the Problems

A semiconductor optical integrated element according to the present disclosure includes: a substrate; a laser diode portion which is provided on one end side above the substrate, has a first optical waveguide including a first core layer, and emits a laser beam; a modulator portion which is provided on another end side above the substrate, has a second optical waveguide including a second core layer for guiding the laser beam entering from the first core layer, and modulates the laser beam; a separation region which is provided between the laser diode portion and the modulator portion above the substrate, has the second optical waveguide, and electrically separates the laser diode portion and the modulator portion from each other; and a pair of grooves provided on both sides along the first optical waveguide and the second optical waveguide, wherein the second optical waveguide in the separation region and the second optical waveguide in a part on the separation region side in the modulator portion have a buried structure, and the second optical waveguide in a remaining part in the modulator portion has a high-mesa-ridge structure.

Effect of the Invention

In the semiconductor optical integrated element according to the present disclosure, the second optical waveguide in the separation region and the second optical waveguide in the part on the separation region side in the modulator portion have the buried structure, and the second optical waveguide in the remaining part in the modulator portion has the high-mesa-ridge structure, whereby it becomes possible to achieve both of high-frequency property and necessary heat dissipation required for the modulator portion, thus providing an effect of suppressing property deterioration or element breakage in a case of high beam input.

DESCRIPTION OF EMBODIMENTS

Embodiment 1

Figure 1:
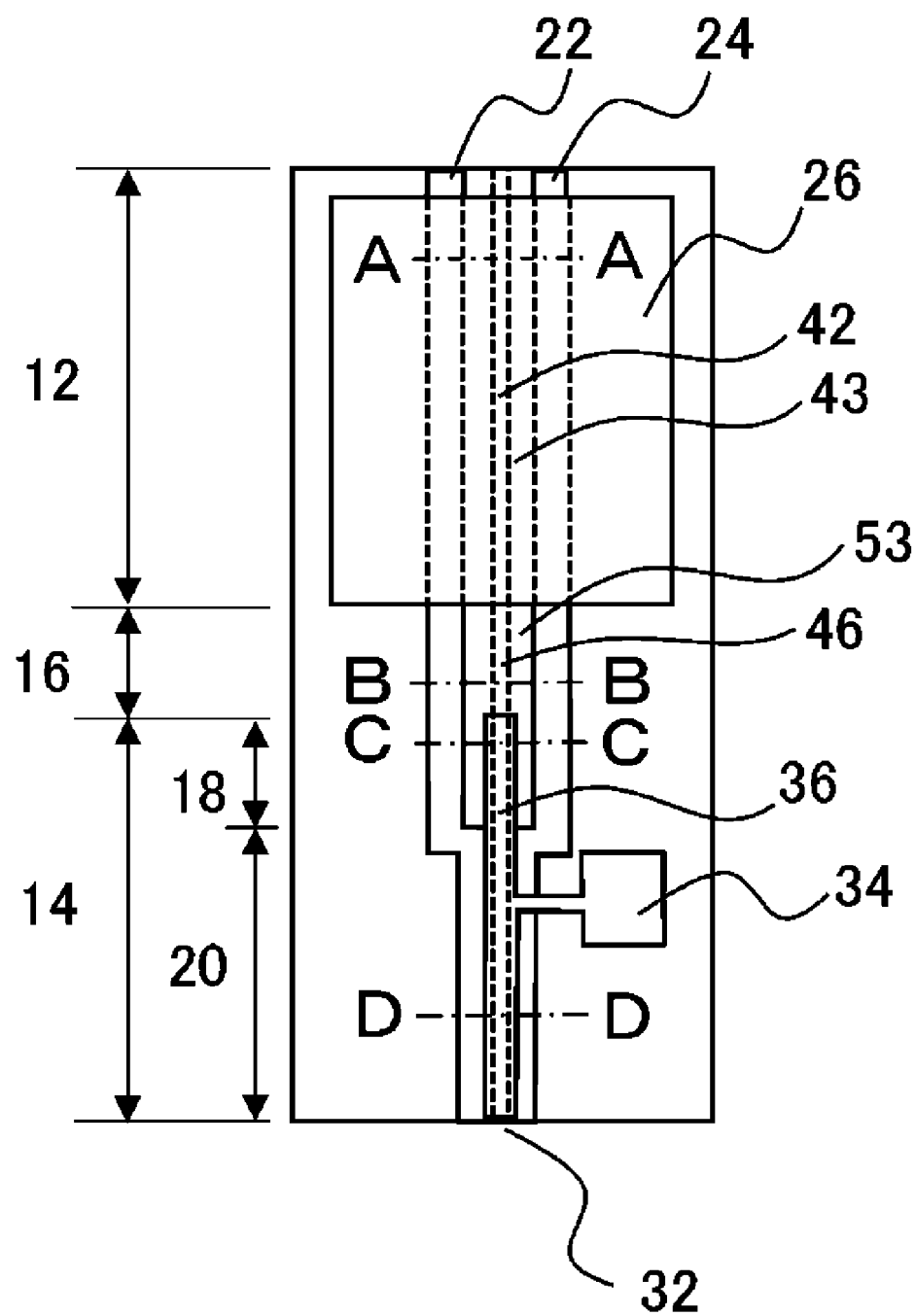
FIG. 1 is a top view of a semiconductor optical integrated element according to embodiment 1.

FIG. 1 is a top view of a semiconductor optical integrated element according to embodiment 1. A laser diode portion (hereinafter, referred to as LD portion) 12 including an LD portion core layer (first core layer) 42 for guiding a laser beam, and an EA modulator portion 14 including an EA modulator portion core layer (second core layer) 46 for guiding and modulating the laser beam generated in the LD portion 12, are integrated on an n-type InP substrate 10. A separation region 16 is provided between the laser diode portion 12 and the EA modulator portion 14. The separation region 16 functions to electrically separate the LD portion 12 and the EA modulator portion 14 from each other.

The LD portion 12 is typically formed as a distributed feedback laser structure. The LD portion 12 has a buried structure in which the LD portion core layer 42 for guiding a laser beam is buried with semiconductor layers at both side surface parts thereof. Here, both side surface parts of the LD portion core layer 42 mean both side surfaces of the LD portion core layer 42 in a direction perpendicular to the laser beam guiding direction and parallel to the surface of the n-type InP substrate 10. It is noted that both side surface parts of the EA modulator portion core layer 46 also have the same meaning.

Figure 2:
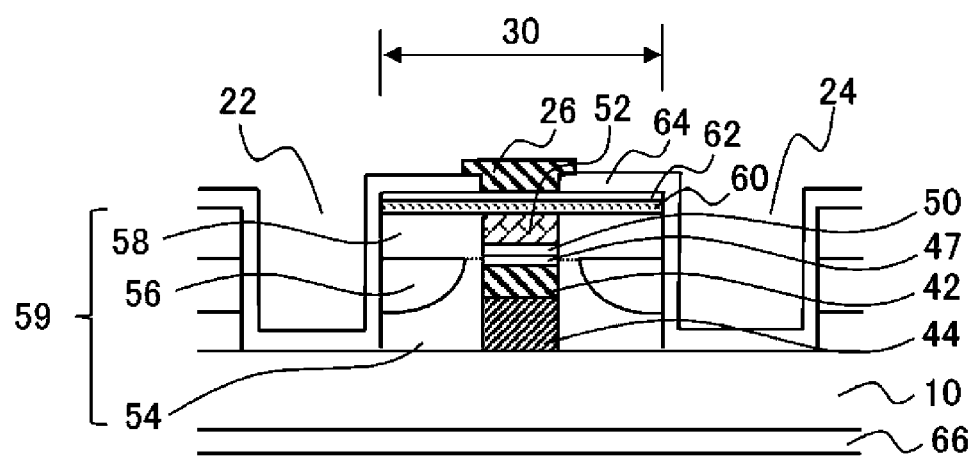
FIG. 2 is a sectional view of a laser diode portion in the semiconductor optical integrated element according to embodiment 1, along line A-A shown in the top view in FIG. 1.

FIG. 2 is a sectional view of the LD portion 12 along line A-A in the top view of the semiconductor optical integrated element according to embodiment 1 shown in FIG. 1.

The LD portion 12 is formed with such a structure that an n-type InP cladding layer 44, the LD portion core layer 42 (first core layer), a p-type InP first cladding layer 47, a diffraction grating 50, and a p-type InP second cladding layer 52 are layered on the n-type InP substrate 10.

On the upper and lower sides of the LD portion core layer 42, the n-type InP cladding layer 44 and the p-type InP first cladding layer 47 having smaller refractive indices than the LD portion core layer 42 are provided, thus forming an optical waveguide. The optical waveguide including the LD portion core layer 42, the n-type InP cladding layer 44, and the p-type InP first cladding layer 47 is referred to as a first optical waveguide 43. It is noted that the first optical waveguide 43 also includes a buried structure described later.

The LD portion core layer 42 is buried, at both side surface parts thereof, with p-type InP first burying layers 54, n-type InP second burying layers 56, and p-type InP third burying layers 58 having greater bandgap energy than the LD portion core layer 42. Hereinafter, the p-type InP first burying layers 54, the n-type InP second burying layers 56, and the p-type InP third burying layers 58 are collectively referred to as semiconductor burying layers 59.

As described above, the LD portion 12 has a buried structure in which the LD portion core layer 42 is buried with the semiconductor burying layers 59 at both side surface parts thereof.

Further, a p-type InP third cladding layer 60 and a p-type contact layer 62 are layered on the p-type InP second cladding layer 52 and the p-type InP third burying layer 58. In the semiconductor burying layers 59 at both side surface parts of the LD portion core layer 42, a groove 22 and a groove 24 are respectively formed along the optical waveguide direction. The LD portion 12 is protected by a passivation film 64 coating the surface of the LD portion 12 including the side surfaces and the bottom surfaces of the groove 22 and the groove 24. A p electrode 26 which is an anode electrode is electrically connected to the p-type contact layer 62 through an opening provided to the passivation film 64 at a position upward of the LD portion core layer 42 relative to the n-type InP substrate 10.

On the other hand, on the back surface side of the n-type InP substrate 10, an n electrode 66 which is a cathode electrode is provided and electrically connected to the n-type InP substrate 10.

A region where current is applied in the LD portion 12 and the surrounding regions of the semiconductor optical integrated element are electrically separated from each other by the groove 22 and the groove 24. The LD portion 12 is provided with the p electrode 26. The LD portion core layer 42 functions as an active layer of the LD portion 12.

Figure 3:
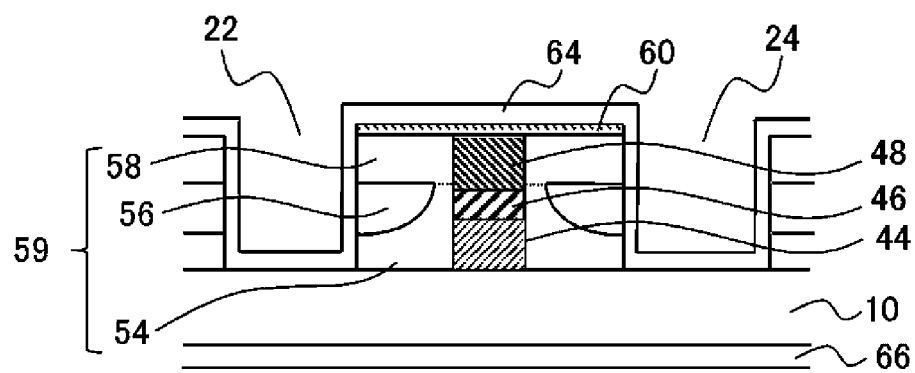
FIG. 3 is a sectional view of a separation region in the semiconductor optical integrated element according to embodiment 1, along line B-B shown in the top view in FIG. 1.

FIG. 3 is a sectional view of the separation region 16 along line B-B in the top view of the semiconductor optical integrated element according to embodiment 1 shown in In the separation region 16, the n-type InP cladding layer 44, the EA modulator portion core layer 46, and a p-type InP fourth cladding layer 48 are layered on the n-type InP substrate 10. As in the LD portion 12, the EA modulator portion core layer 46 is buried, at both side surface parts thereof, with the semiconductor burying layers 59 composed of the p-type InP first burying layers 54, the n-type InP second burying layers 56, and the p-type InP third burying layers 58 having greater bandgap energy than the EA modulator portion core layer 46.

In the separation region 16, unlike the EA modulator portion 14, optical modulation is not performed for the laser beam generated in the LD portion 12. However, since the core layer structure as an optical waveguide is the same as that of the EA modulator portion 14, the core layer as an optical waveguide in the separation region 16 is also referred to as the EA modulator portion core layer 46, for convenience sake.

On the upper and lower sides of the EA modulator portion core layer 46, the n-type InP cladding layer 44 and the p-type InP fourth cladding layer 48 having smaller refractive indices than the EA modulator portion core layer 46 are provided, thus forming an optical waveguide. The optical waveguide including the LD portion core layer 42, the n-type InP cladding layer 44, and the p-type InP fourth cladding layer 48 is referred to as a second optical waveguide 53. It is noted that the second optical waveguide 53 also includes a buried structure or a high-mesa-ridge structure described later.

Further, a p-type InP third cladding layer 60 is layered on the p-type InP fourth cladding layer 48 and the p-type InP third burying layer 58. Unlike the LD portion 12 or the EA modulator portion 14, such a p-type contact layer 62 and a p electrode 26 as provided in the LD portion 12 or the EA modulator portion 14 are not present on the p-type InP third burying layer 58.

As described above, the separation region 16 has a buried structure in which the EA modulator portion core layer 46 is buried with the semiconductor burying layers 59 at both side surface parts thereof.

The EA modulator portion 14 is a region acting as an EA modulator. A part on the LD portion 12 side (beam input side) of the EA modulator portion 14, i.e., a part adjacent to the separation region 16, is formed as a buried EA modulator portion 18 having a buried structure, and the remaining part of the EA modulator portion 14 is a high-mesa EA modulator portion 20 having a high-mesa-ridge structure. The EA modulator portion core layer 46 in the EA modulator portion 14 functions as an absorption layer for the laser beam guided through the separation region 16 from the LD portion 12. As shown in the top view in FIG. 1, an EA modulator portion electrode 36 and an EA modulator portion bonding pad 34 are provided for applying voltage to the EA modulator portion core layer 46.

As in the LD portion 12, in the EA modulator portion 14, a region where voltage is applied and the surrounding regions of the semiconductor optical integrated element are electrically separated from each other by the groove 22 and the groove 24.

Figure 4:
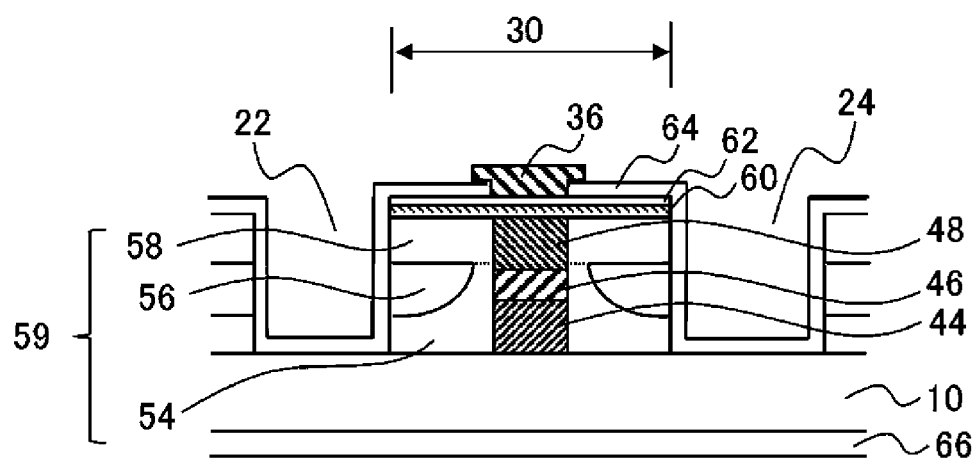
FIG. 4 is a sectional view of a buried EA modulator portion in the semiconductor optical integrated element according to embodiment 1, along line C-C shown in the top view in FIG. 1.

FIG. 4 is a sectional view of the buried EA modulator portion 18 along line C-C in the top view of the semiconductor optical integrated element according to embodiment 1 shown in FIG. 1.

In the buried EA modulator portion 18, the n-type InP cladding layer 44, the EA modulator portion core layer 46, and the p-type InP fourth cladding layer 48 are layered on the n-type InP substrate 10. The EA modulator portion core layer 46 is buried, at both side surface parts thereof, with the semiconductor burying layers 59 composed of the p-type InP first burying layers 54, the n-type InP second burying layers 56, and the p-type InP third burying layers 58 having greater bandgap energy than the EA modulator portion core layer 46.

The p-type InP third cladding layer 60 and the p-type contact layer 62 are layered on the p-type InP fourth cladding layer 48 and the p-type InP third burying layer 58. As described above, the buried EA modulator portion 18 has a buried structure in which the EA modulator portion core layer 46 is buried with the semiconductor burying layers 59 at both side surface parts thereof.

Figure 5:
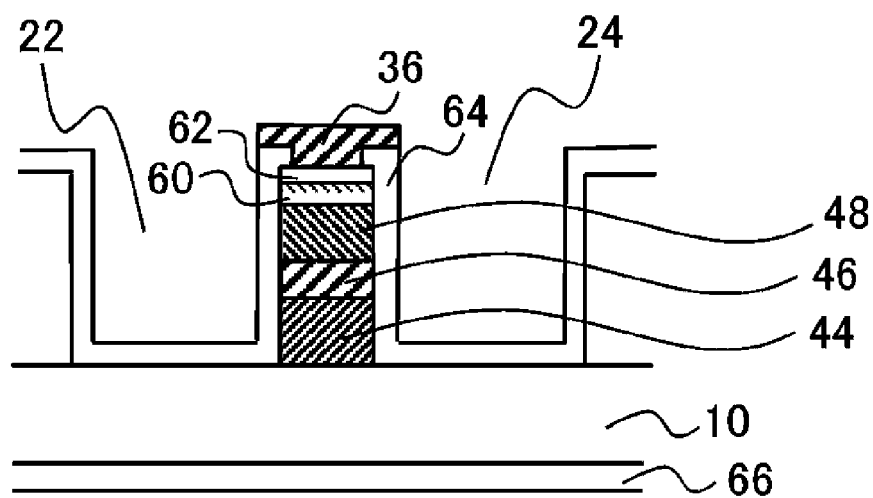
FIG. 5 is a sectional view of a high-mesa EA modulator portion in the semiconductor optical integrated element according to embodiment 1, along line D-D shown in the top view in FIG. 1.

FIG. 5 is a sectional view of the high-mesa EA modulator portion 20 along line D-D in the top view of the semiconductor optical integrated element according to embodiment 1 shown in FIG. 1.

In the high-mesa EA modulator portion 20, the n-type InP cladding layer 44, the EA modulator portion core layer 46, and the p-type InP fourth cladding layer 48 are layered on the n-type InP substrate 10. In addition, the p-type InP third cladding layer 60 and the p-type contact layer 62 are layered on the p-type InP fourth cladding layer 48.

Both side surface parts of the EA modulator portion core layer 46 are protected by the passivation film 64 made of an insulating material such as a nitride film (SiN), and at the outside thereof, air is present. As described above, the high-mesa EA modulator portion 20 has a high-mesa-ridge structure in which the EA modulator portion core layer 46 is not buried with burying layers such as semiconductor burying layers at both side surface parts thereof.

The EA modulator portion core layer 46 is sandwiched between cladding layers (i.e., the n-type InP cladding layer 44 and the p-type InP fourth cladding layer 48) having smaller refractive indices than the EA modulator portion core layer 46, from the upper and lower sides. Thus, the laser beam generated in the LD portion 12 is mainly confined within the EA modulator portion core layer 46 and guided along the EA modulator portion core layer 46.

A width 30 of a buried structure part in the buried EA modulator portion 18 is, for example, 10 µm. Meanwhile, a width of the EA modulator portion core layer 46 is, for example, 1.5 µm. It is noted that the width 30 of the buried structure part refers to the interval between the side surfaces of the groove 22 and the groove 24 opposed to each other across the buried structure.

An example of the length in the optical waveguide direction of the EA modulator portion 14 is as follows: the entire length of the EA modulator portion 14 is 200 µm, the length of the buried EA modulator portion 18 is 30 µm, and the length of the high-mesa EA modulator portion 20 is 170 µm.

A manufacturing method for the semiconductor optical integrated element according to embodiment 1 will be described below.

Figure 6:
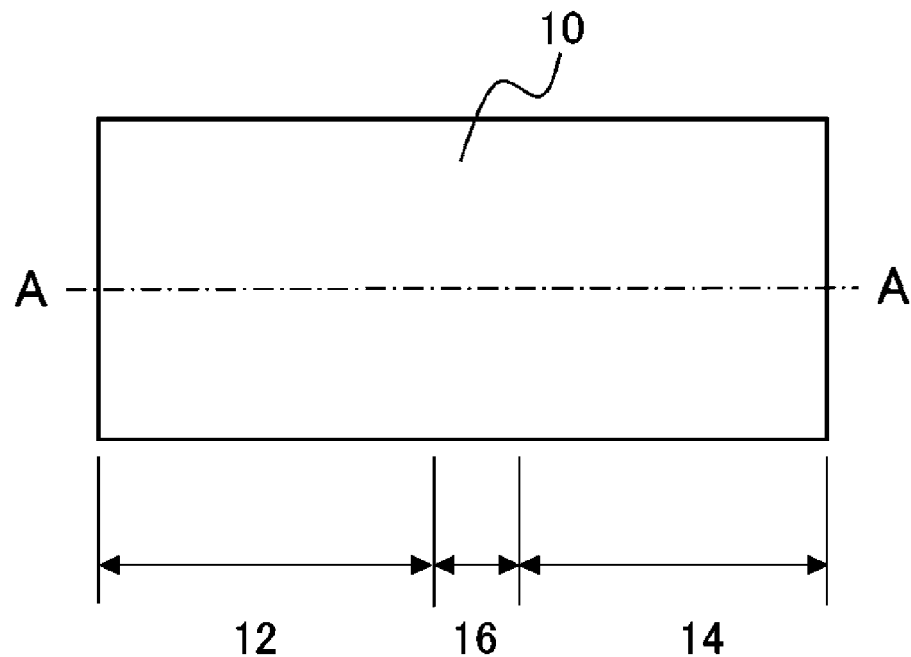
FIG. 6 shows a manufacturing method for the semiconductor optical integrated element according to embodiment 1 and shows the LD portion, the separation region, and the EA modulator portion when the semiconductor optical integrated element is seen from above.
Figure 7:
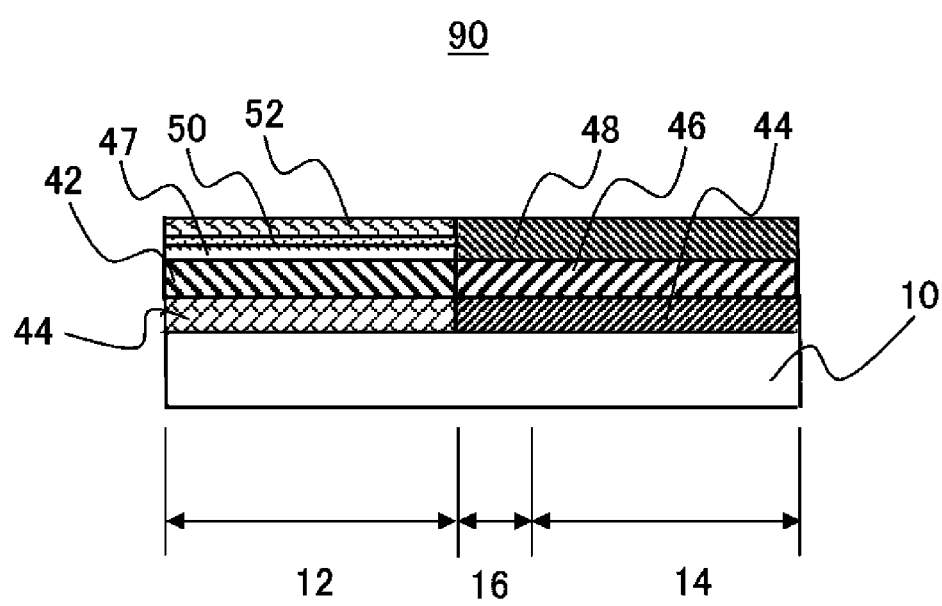
FIG. 7 shows the manufacturing method for the semiconductor optical integrated element according to embodiment 1 and is a sectional view including a core layer along an optical waveguide direction.

First, as shown in FIG. 6 which is a top view showing the regions of the semiconductor optical integrated element and FIG. 7 which is a sectional view along line A-A in FIG. 6, i.e., along the optical waveguide direction, a semiconductor layered structure 90 including the LD portion core layer 42 and the EA modulator portion core layer 46 is formed on the n-type InP substrate 10. The semiconductor layered structure 90 is such a structure that, in the region for forming the LD portion 12, the n-type InP cladding layer 44, the LD portion core layer 42, the p-type InP first cladding layer 47, the diffraction grating 50, and the p-type InP second cladding layer 52 are layered on the n-type InP substrate 10, and in the regions for forming the EA modulator portion 14 and the separation region 16, the n-type InP cladding layer 44, the EA modulator portion core layer 46, and the p-type InP fourth cladding layer 48 are layered on the n-type InP substrate 10.

Figure 8:
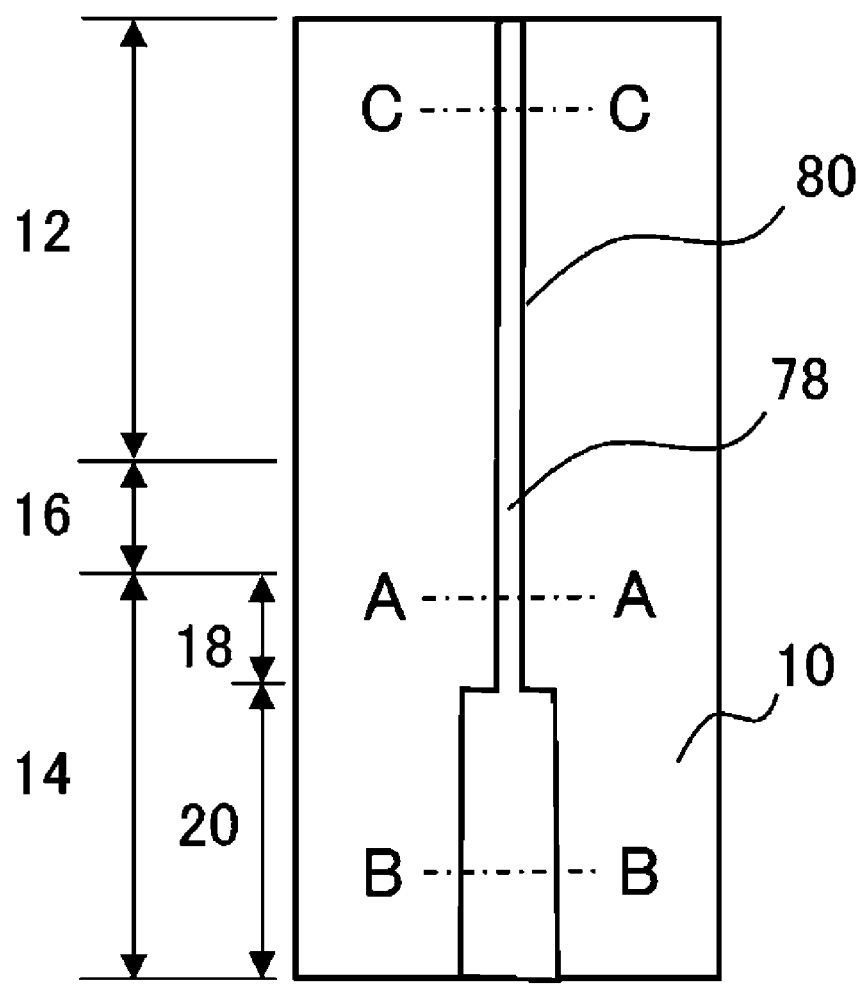
FIG. 8 shows the manufacturing method for the semiconductor optical integrated element according to embodiment 1 and shows an insulation film pattern on a semiconductor layered structure.

Next, as shown in a top view in FIG. 8, an insulation film 78 is formed on the upper surface of the semiconductor layered structure 90, and the insulation film 78 is patterned so that the insulation film 78 is left at a part corresponding to a ridge structure 80.

Figure 9:
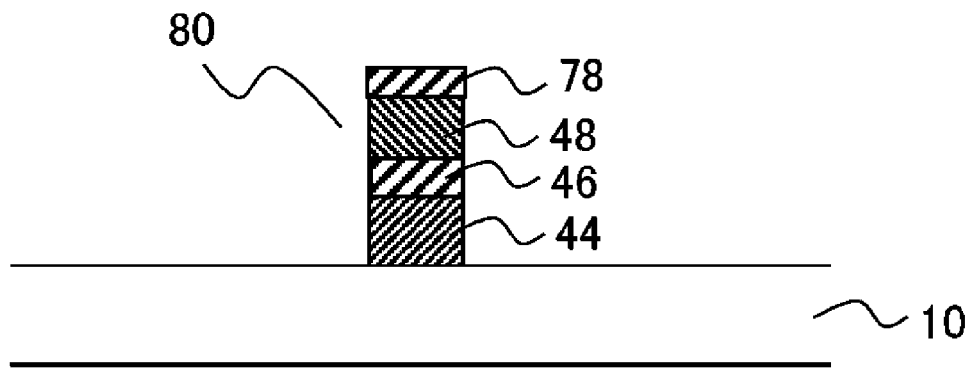
FIG. 9 shows the manufacturing method for the semiconductor optical integrated element according to embodiment 1 and is a sectional view of a ridge structure in the buried EA modulator portion along line A-A in FIG. 8.
Figure 10:
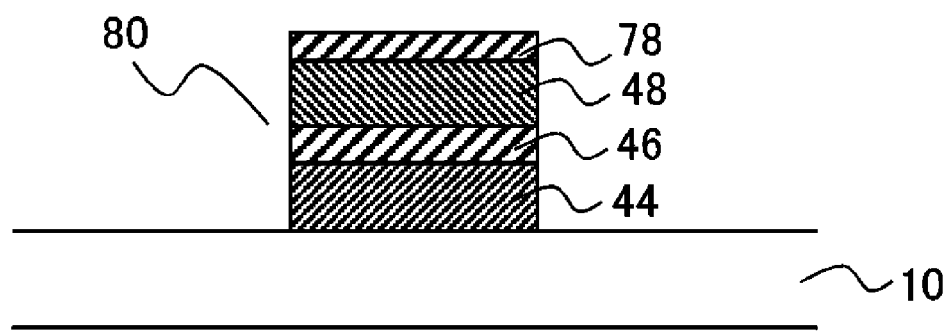
FIG. 10 shows the manufacturing method for the semiconductor optical integrated element according to embodiment 1 and is a sectional view of a ridge structure in the high-mesa EA modulator portion along line B-B in FIG. 8.
Figure 11:
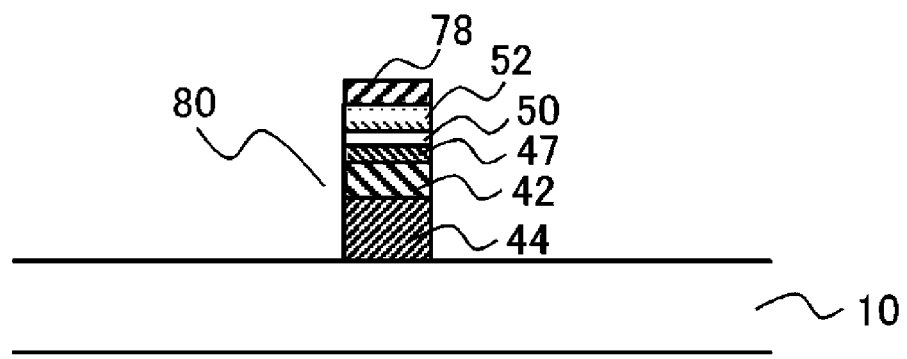
FIG. 11 shows the manufacturing method for the semiconductor optical integrated element according to embodiment 1 and is a sectional view of a ridge structure in the laser diode portion along line C-C in FIG. 8.

Using the insulation film 78 as an etching mask, the semiconductor layered structure 90 is etched by an etching method such as dry etching, so as to form the ridge structure 80 as shown in sectional views in FIG. 9, FIG. 10, and FIG. 11. The ridge structure 80 exhibits a stripe shape in the optical waveguide direction.

FIG. 9 is a sectional view along line A-A in FIG. 8, i.e., a sectional view of the ridge structure 80 in the region for forming the buried EA modulator portion 18. FIG. 10 is a sectional view along line B-B in FIG. 8, i.e., a sectional view of the ridge structure 80 in the region for forming the high-mesa EA modulator portion 20. FIG. 11 is a sectional view along line C-C in FIG. 8, i.e., a sectional view of the ridge structure 80 in the region for forming the LD portion 12. The width of the ridge structure 80 in the regions for forming the LD portion 12, the separation region 16, and the buried EA modulator portion 18 is set to be smaller than the width of the ridge structure 80 in the region for forming the high-mesa EA modulator portion 20.

Next, the ridge structure 80 in the LD portion 12, the separation region 16, and the buried EA modulator portion 18 is buried, at both side surface parts thereof, with the semiconductor burying layers 59 composed of the p-type InP first burying layers 54, the n-type InP second burying layers 56, and the p-type InP third burying layers 58. Thereafter, the insulation film 78 is removed, and the p-type InP third cladding layer 60 and the p-type contact layer 62 are layered.

Figure 12:
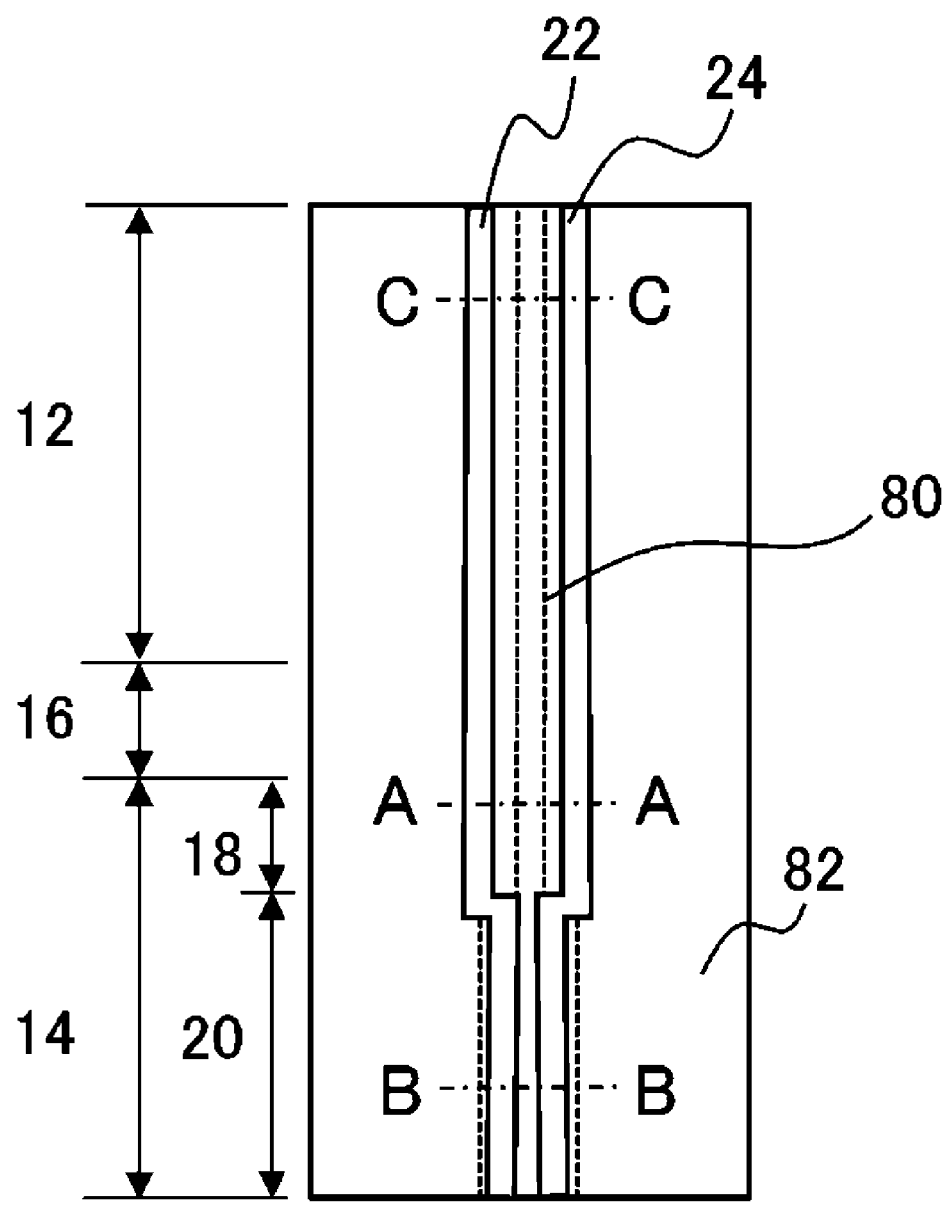
FIG. 12 shows the manufacturing method for the semiconductor optical integrated element according to embodiment 1 and is a top view after grooves are formed.

Next, as shown in a top view in FIG. 12, using an insulation film mask 82 as a mask, the ridge structure 80 and the semiconductor burying layers 59 composed of the p-type InP first burying layers 54, the n-type InP second burying layers 56, and the p-type InP third burying layers 58 are etched to form the groove 22 and the groove 24. Thus, the LD portion 12 shown in the sectional view in FIG. 2, the separation region 16 shown in the sectional view in the FIG. 3, the buried EA modulator portion 18 shown in the sectional view in the FIG. 4, and the high-mesa EA modulator portion 20 shown in the sectional view in FIG. 5, are formed.

At this time, the LD portion 12, the separation region 16, and the buried EA modulator portion 18 are formed as a buried structure, and the high-mesa EA modulator portion 20 is formed as a high-mesa-ridge structure.

Operation of the above semiconductor optical integrated element will be described below.

When forward-direction current flows through the LD portion 12, laser oscillation occurs and a laser beam is emitted from the LD portion 12. The laser beam first enters the buried EA modulator portion 18 in the EA modulator portion 14, and then is guided to the high-mesa EA modulator portion 20. Then, the laser beam is emitted from an exit end surface 32 to the outside. As described above, the LD portion 12 is formed as a distributed feedback laser structure. In the distributed feedback laser structure, the diffraction grating 50 is provided. The diffraction grating 50 is provided in a periodic form along the advancing direction of the laser beam, and functions to reflect a laser beam having a specific wavelength. Thus, through the action of the diffraction grating 50, a laser beam in a single oscillation mode can be obtained.

On the other hand, the EA modulator has an electric field absorbing effect that the optical absorption amount increases when reverse bias voltage is applied. Using the electric field absorbing effect, the inputted laser beam is optically modulated in accordance with high/low voltage applied to the EA modulator. When the beam is absorbed, photoelectric current occurs and heat is generated.

The beam distribution in the optical waveguide direction in the EA modulator portion 14 is represented by the following Expression (1), with x defined as the distance from the beam entrance end.

$$P(x)=P_0*\exp(-\Gamma \alpha x) \quad (1)$$

Here, $P_0$ is the intensity of a laser beam entering the EA modulator portion 14, $\Gamma$ is an optical confinement factor of the optical waveguide, and $\alpha$ is an absorption coefficient. From Expression (1), a fact that optical absorption is maximized at the entrance end and thus the heat generation amount is also maximized in the vicinity of the entrance end, is derived.

Next, effects of the semiconductor optical integrated element according to embodiment 1 will be described.

In the buried EA modulator portion 18, as shown in the sectional view of the buried EA modulator portion 18 in FIG. 4, the EA modulator portion core layer 46 functioning as an optical absorption layer is buried with the semiconductor burying layers 59 at both side surface parts thereof, and thus the semiconductor burying layers 59 function also as heat dissipation bodies.

As compared to the high-mesa EA modulator portion 20 in which the EA modulator portion core layer 46 is not buried at side surface parts thereof, heat generation due to photoelectric current occurring around the EA modulator portion core layer 46 can be efficiently dissipated. This is because the semiconductor burying layers 59 have a higher thermal conductivity than the high-mesa-ridge structure whose side surface parts are in contact with air.

As is found from Expression (1), the optical absorption amount is maximized in the vicinity of the entrance end of the EA modulator portion 14 and is exponentially attenuated toward the exit end side. Therefore, simply forming a part on the entrance end side as a buried structure can provide a sufficiently great heat dissipation effect.

Meanwhile, a major part of the EA modulator portion 14 is formed as the high-mesa EA modulator portion 20 having a small electric capacitance. Thus, the capacitive component is reduced, whereby high-frequency property is improved. With the semiconductor optical integrated element according to embodiment 1, it is possible to achieve both of high-frequency property and necessary heat dissipation required for the EA modulator portion 14, thus providing an effect of suppressing property deterioration or element breakage in a case of high beam input.

The semiconductor layered structure of the semiconductor burying layer 59 in the buried EA modulator portion 18 can be formed through the same epitaxial growth process as the semiconductor burying layer 59 in the LD portion 12. Therefore, it is not necessary to add a new epitaxial process, and the manufacturing process can be simplified. As a matter of course, they may be formed through separate processes.

As an alternative to the n-type InP substrate 10, a p-type InP substrate or a semi-insulating InP substrate may be used. In a case of using the n-type InP substrate 10, a p-type semiconductor is on the upper surface side, thus obtaining an effect that electric isolation between the LD portion 12 and the EA modulator portion 14 is enhanced as compared to a case of using a p-type InP substrate.

For the EA modulator portion 14, a traveling-wave electrode may be adopted. However, in a case of adopting a traveling-wave electrode, in particular, it is essential that loss of microwaves is small.

As semiconductor materials forming the p-type InP first burying layer 54 and the n-type InP second burying layer 56, instead of p-type InP or n-type InP, a semiconductor material such as a Fe-doped InP layer may be used, for example.

The LD portion core layer 42 in the LD portion 12 is, for example, formed by an AlGaInAs-based or InGaAsP-based multiple quantum well layer, and the bandgap wavelength of the multiple quantum well layer is 1.2 to 1.62 μm.

On the other hand, the EA modulator portion core layer 46 of the EA modulator portion 14 is, for example, formed by an AlGaInAs-based or InGaAsP-based multiple quantum well layer, and the bandgap wavelength of the multiple quantum well layer is 0.9 to 1.55 μm. That is, the bandgap wavelength of the EA modulator portion core layer 46 is set to be shorter than the oscillation wavelength of the LD portion 12.

The LD portion core layer 42 and the EA modulator portion 14 may be formed by applying a selective growth method or may be separately grown through Butt-joint growth and connected.

The LD portion 12, the separation region 16, and the EA modulator portion 14 may be different in the depths of the groove 22 and the groove 24. For example, the depths of the groove 22 and the groove 24 in the LD portion 12 are set to 7 μm, the depths of the groove 22 and the groove 24 in the separation region 16 are set to 5 μm, and the depths of the groove 22 and the groove 24 in the EA modulator portion 14 are set to 4 μm.

Preferably, the p-type contact layer 62 is not provided in the separation region 16. Thus, effects that loss of a laser beam is reduced and isolation resistance between the LD portion 12 and the EA modulator portion 14 is increased, are obtained.

In the above description of the semiconductor optical integrated element, the structure in which the semiconductor burying layers 59 in the buried EA modulator portion 18 are provided at both side surface parts of the EA modulator portion core layer 46, is adopted. However, the semiconductor burying layer 59 may be selectively provided only at one side surface part instead of both side surface parts, as necessary, depending on a purpose such as a small beam input power application.

In a case of providing the semiconductor burying layer 59 only at one side surface part, the capacitive component generated by the semiconductor burying layer 59 is reduced, and therefore high-frequency property is improved as compared to the case of providing the semiconductor burying layers 59 at both side surface parts. This is effective in a case where the beam input amount to the EA modulator portion 14 is comparatively small and higher frequency property rather than heat dissipation is required as the element property.

Embodiment 2

Figure 13:
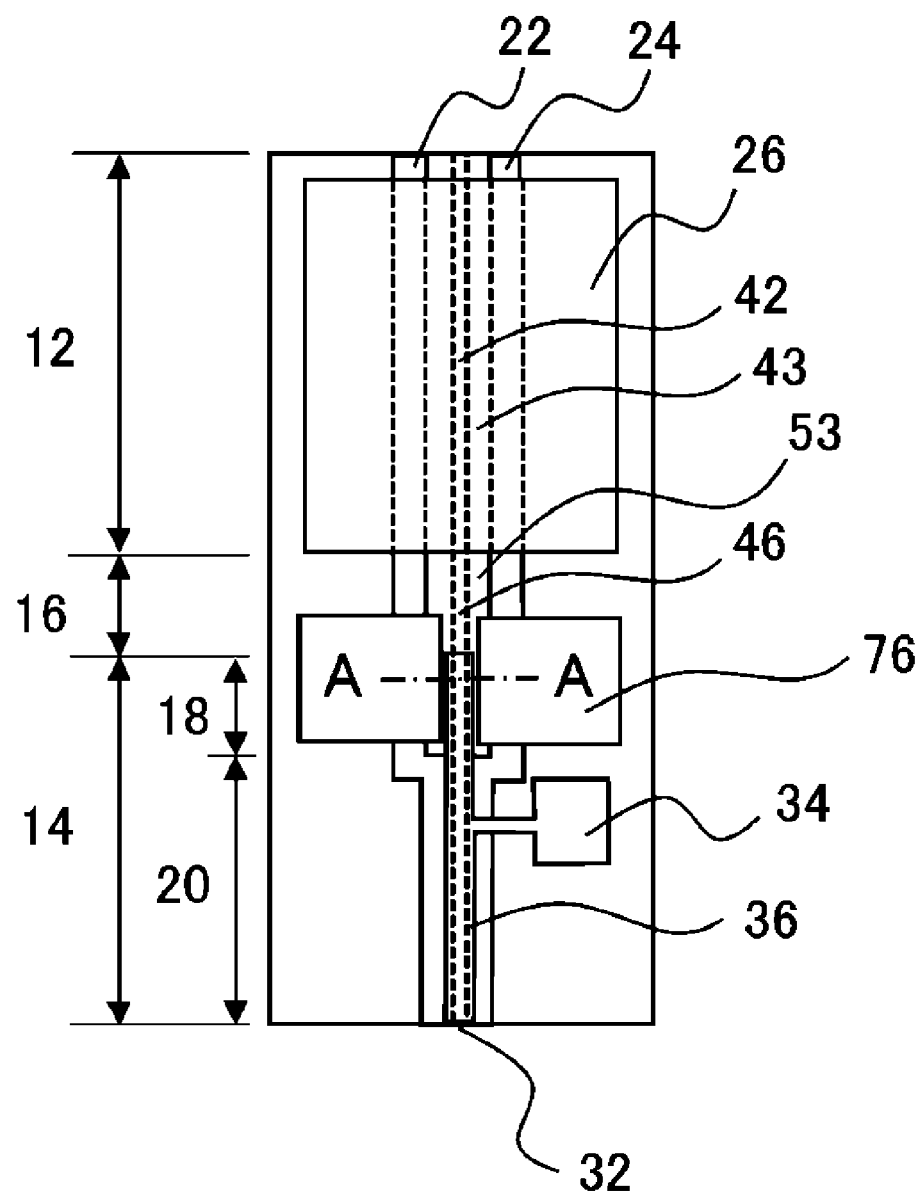
FIG. 13 is a top view of a semiconductor optical integrated element according to embodiment 2.
Figure 14:
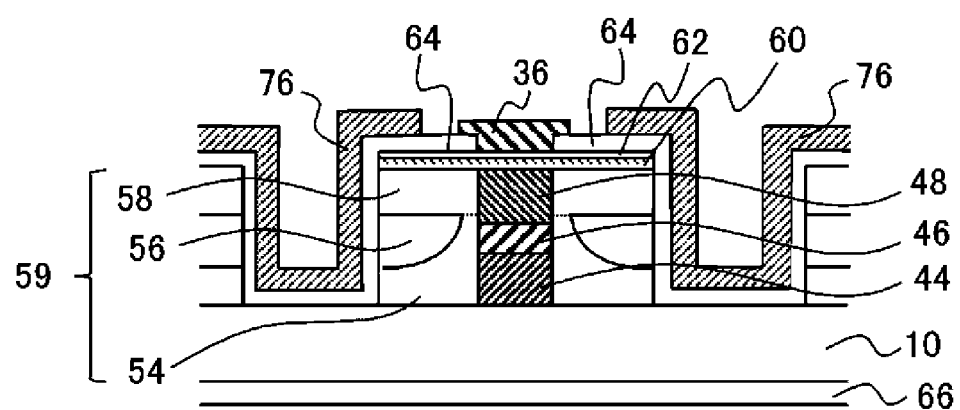
FIG. 14 is a sectional view of the semiconductor optical integrated element according to embodiment 2, along line A-A in FIG. 13.

FIG. 13 is a top view of a semiconductor optical integrated element according to embodiment 2 and shows arrangement of heat dissipation metal 76 provided for further improving heat dissipation in addition to the semiconductor burying layers 59 functioning as heat dissipation bodies. FIG. 14 is a sectional view of the buried EA modulator portion 18 along line A-A in the top view in FIG. 13. In the semiconductor optical integrated element according to embodiment 2, as shown in FIG. 13 and FIG. 14, the heat dissipation metal 76 is provided to be as close to the semiconductor burying layer 59 as possible, thus forming a structure for facilitating dissipation of heat generated in the EA modulator portion core layer 46.

A metal material forming the heat dissipation metal 76 is, for example, gold. By using gold which has a high thermal conductivity, heat dissipation can be further improved as compared to a case of not having such metal, i.e., in a case of air. It is noted that the heat dissipation metal 76 is not electrically connected to the p electrode 26 in the LD portion 12 and the EA modulator portion electrode 36 and the EA modulator portion bonding pad 34 in the EA modulator portion 14, and therefore does not have any influence on high-frequency property of the EA modulator portion 14.

Embodiment 3

Figure 15:
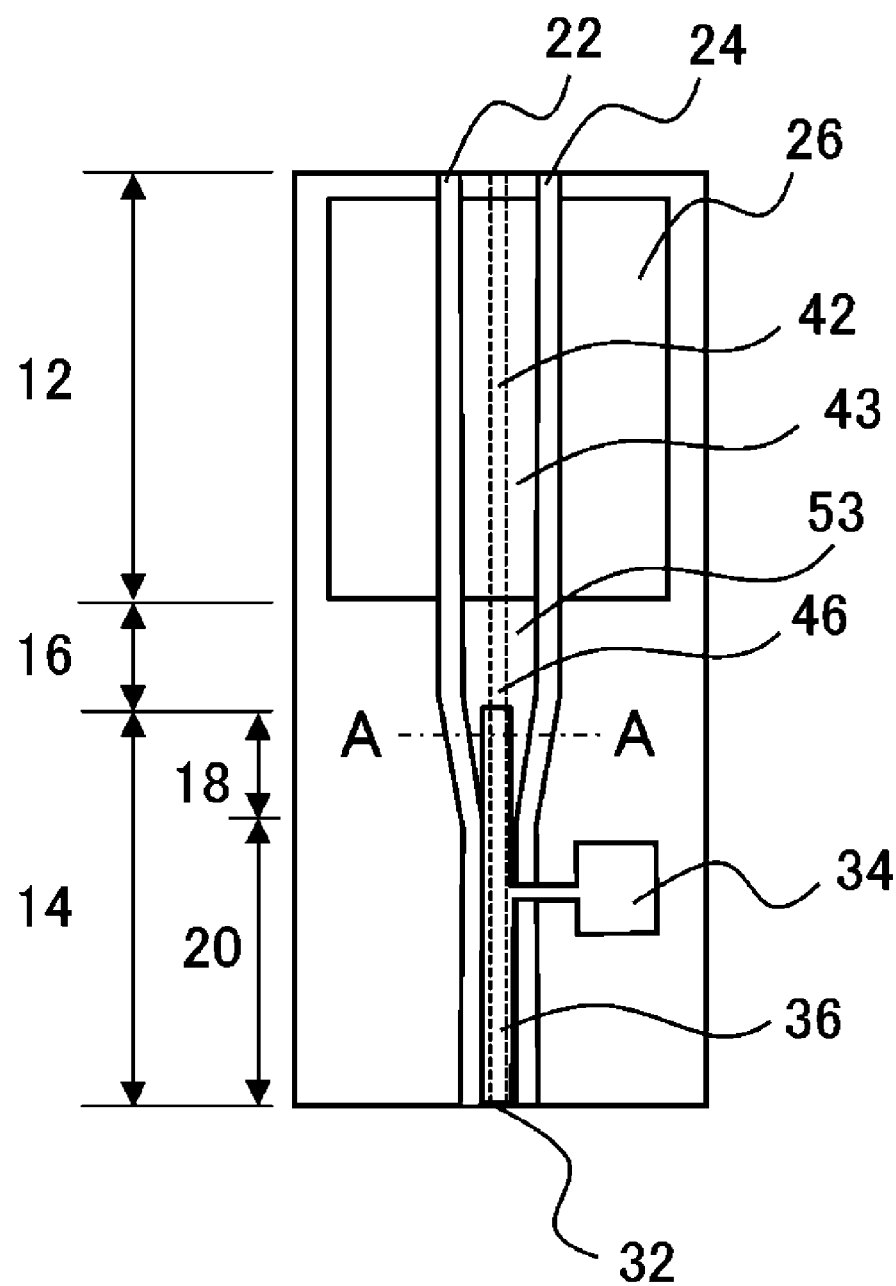
FIG. 15 is a top view showing a semiconductor optical integrated element according to embodiment 3.

FIG. 15 is a top view of a semiconductor optical integrated element according to embodiment 3.

In this structure, the width 30 of the buried structure part in the buried EA modulator portion 18 shown in FIG. 4 expands toward the beam input side, i.e., as approaching the separation region 16 side. The width 30 of the buried structure part may further expand from the buried EA modulator portion 18 side over a part of the separation region 16.

For example, the width 30 of the buried structure part on the beam entrance end side of the buried EA modulator portion 18, i.e., at a part connecting to the separation region 16, is 10 μm, and the width 30 of the buried structure part on the exit end side of the buried EA modulator portion 18, i.e., at a part connecting to the high-mesa EA modulator portion 20, is 3 μm.

Figure 16:
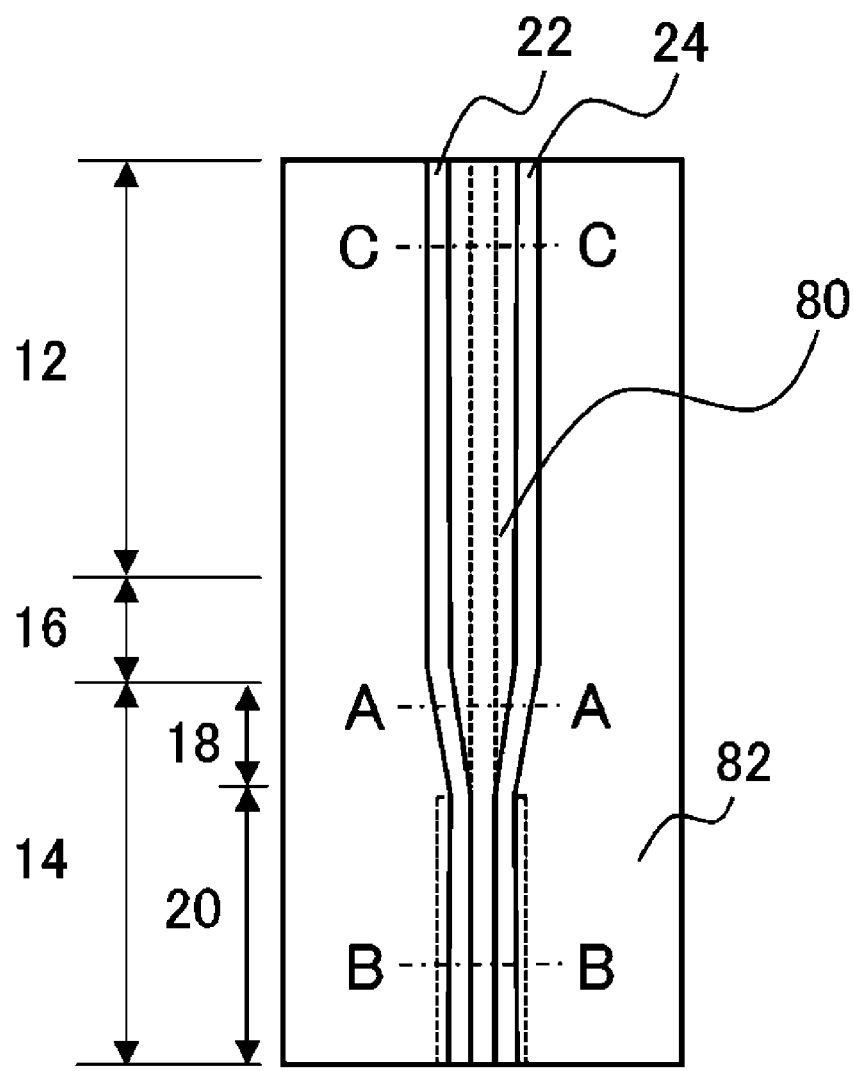
FIG. 16 shows an insulation film pattern of the semiconductor optical integrated element according to embodiment 3.

FIG. 16 shows a pattern of an insulation film mask 82 needed for forming the groove 22 and the groove 24 of the semiconductor optical integrated element according to embodiment 3. The pattern of the insulation film mask 82 is formed such that the width 30 of the buried structure part in the buried EA modulator portion 18 expands toward the beam input side.

By adopting the structure in which the width 30 of the buried structure part in the buried EA modulator portion 18 expands toward the beam input side, heat dissipation on the beam entrance side of the buried EA modulator portion 18 where the heat generation amount is large is improved, and meanwhile, as the width 30 of the buried structure part in the buried EA modulator portion 18 expands, the capacitive component increases and thus the high-frequency property is deteriorated, and therefore the width 30 is narrowed on the beam exit side where the heat generation amount is relatively small, whereby the capacitance is reduced.

In a case of usage in which the beam input amount to the EA modulator portion 14 is small, it is possible to achieve both of high-frequency property and heat dissipation by optimally designing the width 30 of the buried structure part in the buried EA modulator portion 18 in accordance with the beam input amount.

Embodiment 4

Figure 17:
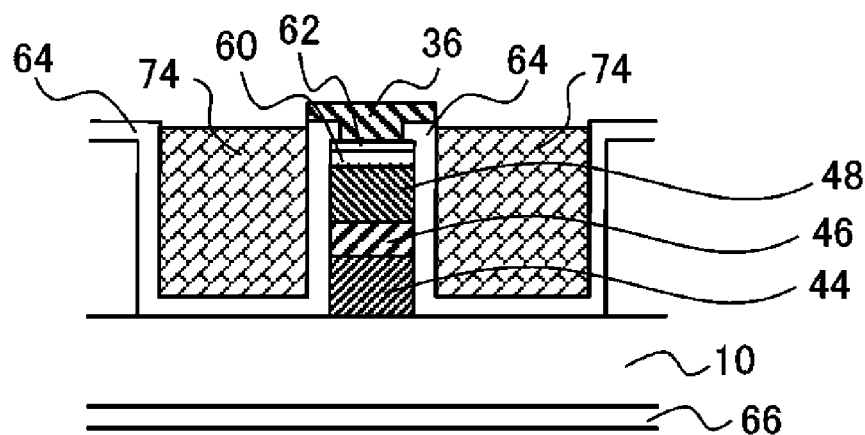
FIG. 17 is a sectional view of a semiconductor optical integrated element according to embodiment 4 at a part corresponding to the buried EA modulator portion along line C-C in FIG. 1.

FIG. 17 is a sectional view of a semiconductor optical integrated element according to embodiment 4 at a part corresponding to the buried EA modulator portion 18 along line C-C in FIG. 1.

Difference from the structure of the semiconductor optical integrated element according to embodiment 1 is that the burying part in the buried EA modulator portion 18 is formed by a passivation film 64 and a heat dissipation body 74, instead of the semiconductor burying layer 59 as in the semiconductor optical integrated element according to embodiment 1.

The heat dissipation body 74 is made of a material having a higher thermal conductivity than the EA modulator portion core layer 46 in the EA modulator portion 14.

Examples of the material include aluminum nitride (AlN), silicon (Si), silicon carbide (SiC), and diamond-like carbon (DLC).

It is desirable that the passivation film 64 is made of a material having a higher thermal conductivity than the EA modulator portion core layer 46. However, in view of reliability or adhesion of the passivation film 64, even in a case where the passivation film 64 is made of a material having a thermal conductivity equal to or lower than that of the EA modulator portion core layer 46, it is possible to promote heat dissipation to the heat dissipation body 74 by reducing the thickness of the passivation film 64.

For example, the passivation film 64 is made of an insulating material such as Silicon dioxide ($SiO_2$) or SiN and has a thickness of 0.2 μm, and the heat dissipation body 74 is made of AlN. Alternatively, the passivation film 64 and the heat dissipation body 74 may be made of the same material.

In the high-mesa EA modulator portion 20, such a heat dissipation body corresponding to heat dissipation body 74 is not provided. Therefore, there is no influence on the capacitive component in the high-mesa EA modulator portion 20.

The thermal conductivity of InP is about 70 W/(m·K) whereas the thermal conductivity of AlN is about 170 W/(m·K). Thus, as compared to the semiconductor optical integrated element according to embodiment 1, heat dissipation can be more improved, and property deterioration or element breakage in a case of high beam input can be more suppressed.

Embodiment 5

Figure 18:
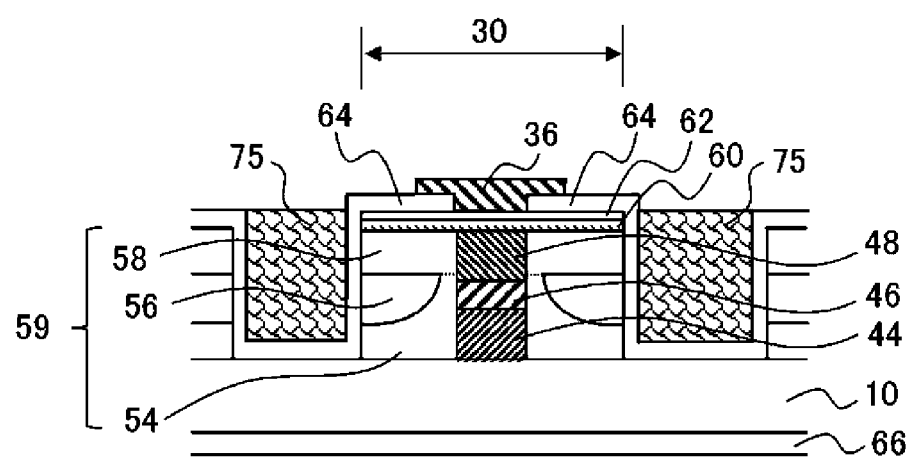
FIG. 18 is a sectional view of a semiconductor optical integrated element according to embodiment 5 at a part corresponding to the buried EA modulator portion along line C-C in FIG. 1.

FIG. 18 is a sectional view of a semiconductor optical integrated element according to embodiment 5 at a part corresponding to the buried EA modulator portion 18 along line C-C in FIG. 1. The parts corresponding to the groove 22 and the groove 24 in the buried EA modulator portion 18 of the semiconductor optical integrated element according to embodiment 1 are each buried with a heat dissipation body 75 in the semiconductor optical integrated element according to embodiment 5.

The heat dissipation body 75 is made of a material having a higher thermal conductivity than InP which is the material forming the semiconductor burying layer 59. The material of the heat dissipation body 75 is, for example, AlN, Si, SiC, DLC, or the like.

It is desirable that the passivation film 64 is made of a material having a higher thermal conductivity than InP which is the material forming the semiconductor burying layer 59 of the semiconductor optical integrated element according to embodiment 1. However, in view of reliability or adhesion of the insulation film, even in a case of using a material having a thermal conductivity equal to or lower than that of the EA modulator portion core layer 46, it is possible to promote heat dissipation to the heat dissipation body 75 by reducing the thickness of the film.

For example, the passivation film 64 is made of an insulating material such as $SiO_2$ or SiN and has a thickness of 0.2 μm, and the heat dissipation body 75 is made of AlN. Alternatively, the passivation film 64 and the heat dissipation body 75 may be made of the same material.

In the high-mesa EA modulator portion 20, such a heat dissipation body corresponding to the heat dissipation body 75 is not provided. Therefore, there is no influence on the capacitive component in the high-mesa EA modulator portion 20.

The thermal conductivity of InP is about 70 W/(m·K) whereas the thermal conductivity of AlN is about 170 W/(m·K). Thus, as compared to the semiconductor optical integrated element according to embodiment 1, heat dissipation can be more improved, and property deterioration or element breakage in a case of high beam input can be more suppressed.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 10 n-type InP substrate
12 laser diode portion
14 EA modulator portion
16 separation region
18 buried EA modulator portion
20 high-mesa EA modulator portion
22, 24 groove
26 p electrode
30 width of buried structure part
32 exit end surface
34 EA modulator portion bonding pad 36 EA modulator portion electrode
42 LD portion core layer
43 first optical waveguide
44 n-type InP cladding layer
46 EA modulator portion core layer
47 p-type InP first cladding layer
48 p-type InP fourth cladding layer
50 diffraction grating
52 p-type InP second cladding layer
53 second optical waveguide
54 p-type InP first burying layer
56 n-type InP second burying layer
58 p-type InP third burying layer
59 semiconductor burying layer
60 p-type InP third cladding layer
62 p-type contact layer
64 passivation film
66 n electrode
74, 75 heat dissipation body
76 heat dissipation metal
78 insulation film
80 ridge structure
82 insulation film mask
90 semiconductor layered structure

The invention claimed is:

1. A semiconductor optical integrated element comprising:
a substrate;
a laser diode portion which is provided on one end side above the substrate, has a first optical waveguide including a first core layer, and emits a laser beam;
a modulator portion which is provided on another end side above the substrate, has a second optical waveguide including a second core layer for guiding the laser beam entering from the first core layer, and modulates the laser beam;
a separation region which is provided between the laser diode portion and the modulator portion above the substrate, has the second optical waveguide, and electrically separates the laser diode portion and the modulator portion from each other; and
a pair of grooves provided on both sides along the first optical waveguide and the second optical waveguide, wherein
the second optical waveguide in the separation region and the second optical waveguide in a part on the separation region side in the modulator portion have a buried structure, and the second optical waveguide in a remaining part in the modulator portion has a high-mesa-ridge structure.

2. The semiconductor optical integrated element according to claim 1, wherein
the buried structure is formed by a semiconductor burying layer provided at a side surface part of the second optical waveguide.

3. The semiconductor optical integrated element according to claim 1, wherein
heat dissipation metal is provided at, of the pair of grooves, at least a side surface part on the buried structure side.

4. The semiconductor optical integrated element according to claim 1, wherein
the second optical waveguide in the part on the separation region side in the modulator portion is formed in such a shape that a width of the buried structure defined by the pair of grooves expands toward the separation region side.

5. The semiconductor optical integrated element according to claim 1, wherein
the buried structure is formed by a heat dissipation body.

6. The semiconductor optical integrated element according to claim 5, wherein
a thermal conductivity of a material forming the heat dissipation body is greater than thermal conductivities of materials forming the first optical waveguide and the second optical waveguide.

7. The semiconductor optical integrated element according to claim 1, wherein
the buried structure is formed by a semiconductor burying layer and a heat dissipation body having a higher thermal conductivity than the semiconductor burying layer.

8. The semiconductor optical integrated element according to claim 2, wherein
the semiconductor burying layer is formed at the side surface part on one side of the second optical waveguide.

9. The semiconductor optical integrated element according to claim 1, wherein
the laser diode portion has a distributed feedback laser structure.

10. The semiconductor optical integrated element according to claim 2, wherein
the second optical waveguide in the part on the separation region side in the modulator portion is formed in such a shape that a width of the buried structure defined by the pair of grooves expands toward the separation region side.

11. The semiconductor optical integrated element according to claim 2, wherein
the laser diode portion has a distributed feedback laser structure.

12. The semiconductor optical integrated element according to claim 3, wherein
the second optical waveguide in the part on the separation region side in the modulator portion is formed in such a shape that a width of the buried structure defined by the pair of grooves expands toward the separation region side.

13. The semiconductor optical integrated element according to claim 3, wherein
the laser diode portion has a distributed feedback laser structure.

14. The semiconductor optical integrated element according to claim 1, wherein
a first distance between the pair of grooves in the part on the separation region side in the modulator portion is greater than a second distance between the pair of grooves in the remaining part in the modulator portion.

15. A semiconductor optical integrated element comprising:
a substrate;
a laser diode portion which is provided on one end side above the substrate, has a first optical waveguide including a first core layer, and emits a laser beam;
a modulator portion which is provided on another end side above the substrate, has a second optical waveguide including a second core layer for guiding the laser beam entering from the first core layer, and modulates the laser beam;
a separation region which is provided between the laser diode portion and the modulator portion above the substrate, has the second optical waveguide, and electrically separates the laser diode portion and the modulator portion from each other; and a pair of grooves provided on both sides along the first optical waveguide and the second optical waveguide, wherein the second optical waveguide in the separation region and the second optical waveguide in a part on the separation region side in the modulator portion have a buried structure, and the second optical waveguide in a remaining part in the modulator portion has a high-mesa-ridge structure, and heat dissipation metal is provided at, of the pair of grooves, at least a side surface part on the buried structure side.

16. A semiconductor optical integrated element comprising:

a substrate;

a laser diode portion which is provided on one end side above the substrate, has a first optical waveguide including a first core layer, and emits a laser beam;

a modulator portion which is provided on another end side above the substrate, has a second optical waveguide including a second core layer for guiding the laser beam entering from the first core layer, and modulates the laser beam;

a separation region which is provided between the laser diode portion and the modulator portion above the substrate, has the second optical waveguide, and electrically separates the laser diode portion and the modulator portion from each other; and a pair of grooves provided on both sides along the first optical waveguide and the second optical waveguide, wherein the second optical waveguide in the separation region and the second optical waveguide in a part on the separation region side in the modulator portion have a buried structure, and the second optical waveguide in a remaining part in the modulator portion has a high-mesa-ridge structure, and the second optical waveguide in the part on the separation region side in the modulator portion is formed in such a shape that a width of the buried structure defined by the pair of grooves expands toward the separation region side.

* * * * *